US 11,372,072 B2

(12) United States Patent
Piazza et al.

(10) Patent No.: US 11,372,072 B2
(45) Date of Patent: Jun. 28, 2022

(54) RADIO BEACON SYSTEM

(71) Applicants: DRB S.r.l., Monza (IT); Politecnico Di Milano, Milan (IT)

(72) Inventors: Diego Piazza, Sovico (IT); Giuseppe Mena, Chiari (IT); Luca Reggiani, Bologna (IT)

(73) Assignees: POLITECNICO DI MILANO, Milan (IT); DRB S.R.L., Monza (IT)

( * ) Notice: Subject to any disclaimer, the term of this patent is extended or adjusted under 35 U.S.C. 154(b) by 391 days.

(21) Appl. No.: 16/620,053

(22) PCT Filed: Jun. 13, 2018

(86) PCT No.: PCT/IB2018/054319
§ 371 (c)(1),
(2) Date: Dec. 6, 2019

(87) PCT Pub. No.: WO2018/229681
PCT Pub. Date: Dec. 20, 2018

(65) Prior Publication Data
US 2020/0200850 A1  Jun. 25, 2020

(30) Foreign Application Priority Data
Jun. 14, 2017  (IT) .................. 102017000066102

(51) Int. Cl.
*G01S 1/04* (2006.01)
*B64C 39/02* (2006.01)
(Continued)

(52) U.S. Cl.
CPC .......... *G01S 1/0428* (2019.08); *B64C 39/024* (2013.01); *B64D 47/00* (2013.01); *H01Q 3/2605* (2013.01); *B64C 2201/141* (2013.01); *G01S 2201/06* (2019.08)

(58) Field of Classification Search
CPC .......... G01S 1/0428; G01S 1/024; G01S 1/16; G01S 1/18; G01S 1/68; G01S 2201/06;
(Continued)

(56) References Cited

U.S. PATENT DOCUMENTS 4,115,777 A * 9/1978 Taylor ................. G01S 1/18
342/411
4,875,646 A * 10/1989 Browning ........... G05D 1/0202
324/458

(Continued)

FOREIGN PATENT DOCUMENTS

| WO | 1996025673 A1 | 8/1996 |
| WO | 2001094974 A2 | 12/2001 |
| WO | 2015160230 A1 | 10/2015 |

OTHER PUBLICATIONS

Tancredi, Urbano, "International Search Report and Written Opinion of the International Searching Authority for PCT/IB2018/054319," European Patent Office, dated Sep. 27, 2019.
(Continued)

*Primary Examiner* — Cassi J Galt
(74) *Attorney, Agent, or Firm* — Florek & Endres PLLC

(57) ABSTRACT

A radio beacon system configured to assist autonomous flight of one or more unmanned aerial vehicles (UAVs), wherein the radio beacon system comprises: —a drone device (200), configured to be installed on an UAV and including a radio transceiver, and —a radio beacon device (100), configured to be installed on ground and including N antenna arrays (110, 120) with N≥2, one or more radio transceivers configured to communicate with the radio transceiver of the drone device (200), and at least one processing unit (130), wherein each antenna array (110, 120) has M antenna elements (115, 125) with M≥2 associated to respective beamforming electronic weights w(n, m), with n ranging from 1 to N and m ranging from 1 to M, wherein said
(Continued)

at least one processing unit (130) is configured to perform an adaptive beamforming method for assisting autonomous flight of the UAV.

12 Claims, 12 Drawing Sheets

(51) Int. Cl.
*B64D 47/00* (2006.01)
*H01Q 3/26* (2006.01)
(58) Field of Classification Search
CPC ............ H01Q 3/2605; B64C 2201/146; B64C 2201/141
See application file for complete search history.

(56) References Cited

U.S. PATENT DOCUMENTS

| | | |
|---|---|---|
| 5,716,032 A | 2/1998 | McIngvale |
| 7,580,378 B2 | 8/2009 | Carrender et al. |
| 9,429,953 B1 | 8/2016 | Miller et al. |
| 2010/0256841 A1 | 10/2010 | Garrec et al. |
| 2017/0059688 A1 | 3/2017 | Gan |

OTHER PUBLICATIONS

Yonghua Li et al: "Adaptive Instrument Landing System in Future Air Traffic Control", Its Telecommunications Proceedings, 2006 6th International Conference On, IEEE, PI, Jun. 21, 2006 (Jun. 21, 2006), pp. 931-934.
S. Carreno et al.: "A Survey on Terrain Based Navigation for UAVs", OCEANS 2010 MTS/IEEE, 2010, pp. 1-7.
R. F. Hanssen: "Radar Interferometry: Data Interpretation and Error Analysis", The Netherlands Kluwer, 2001.
D. Macagnano et al.: "A comprehensive tutorial on localization: Algorithms and performance analysis tools", International Journal of Wireless Information Networks, vol. 19, No. 4, 2012, pp. 290-231.
A. Moreira et al.: "A tutorial on synthetic aperture radar", IEEE Geoscience and Remote Sensing Magazine, vol. 1, No. 1, Mar. 2013 (Mar. 1, 2013), pp. 6-43.

* cited by examiner

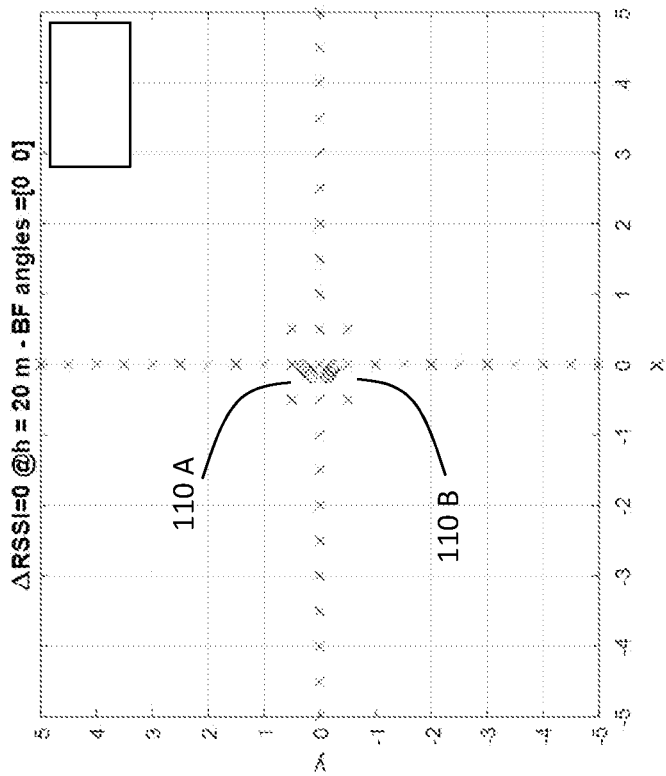
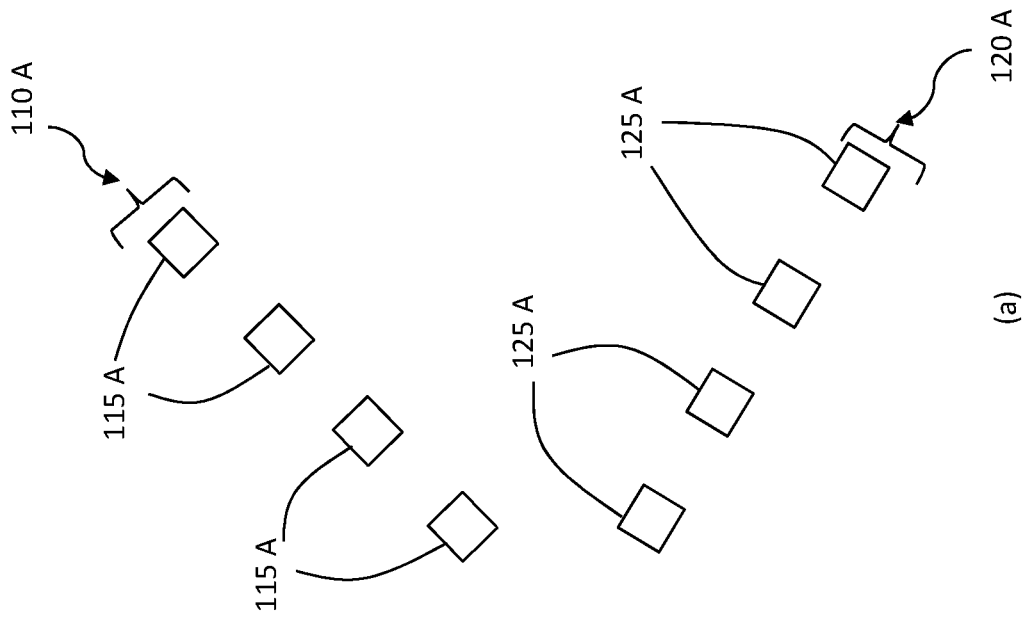
FIG. 8

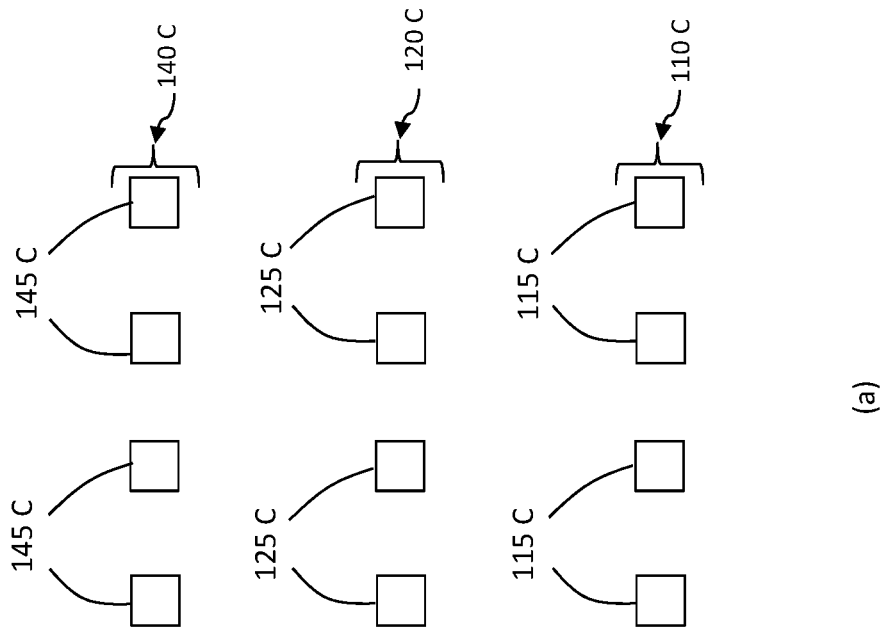
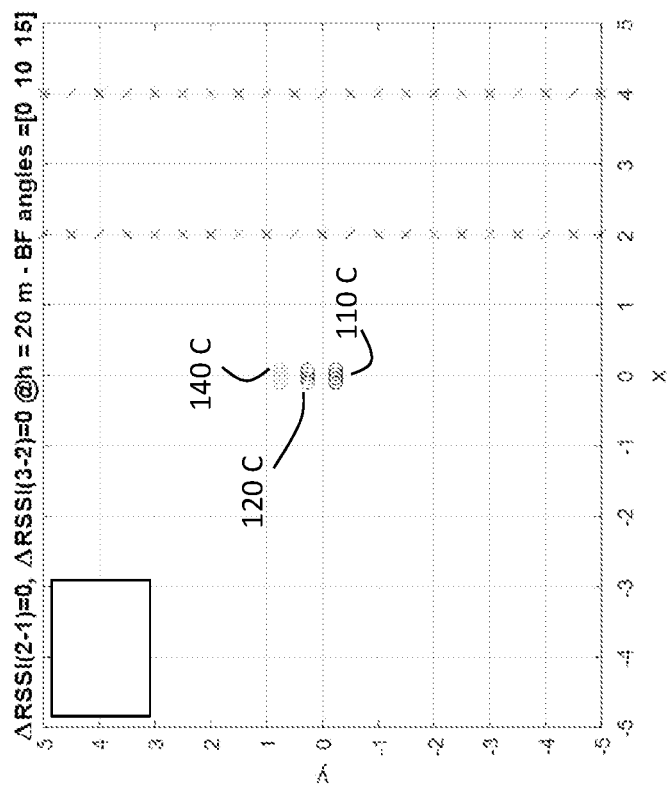
FIG. 10

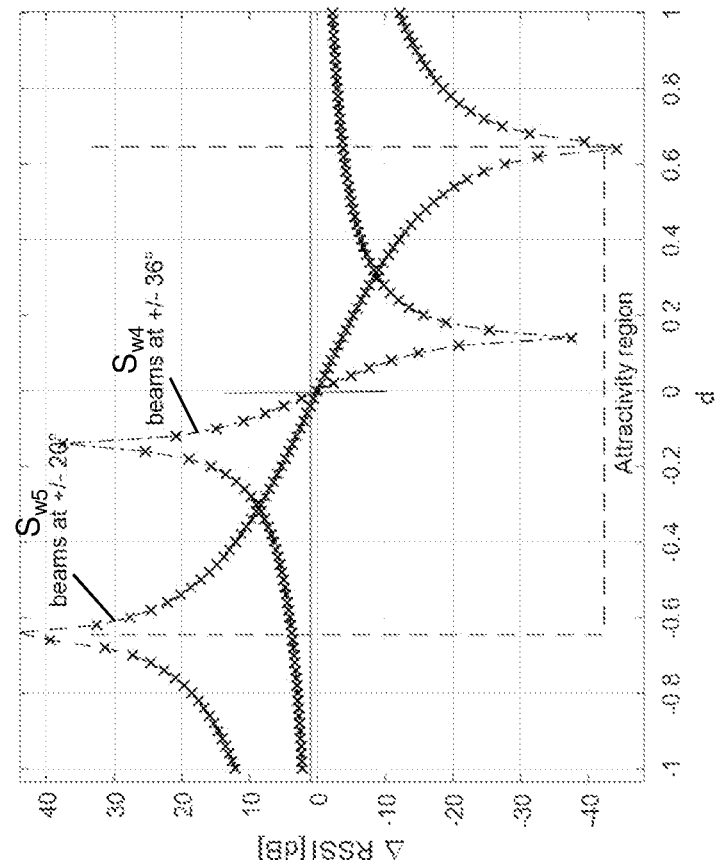
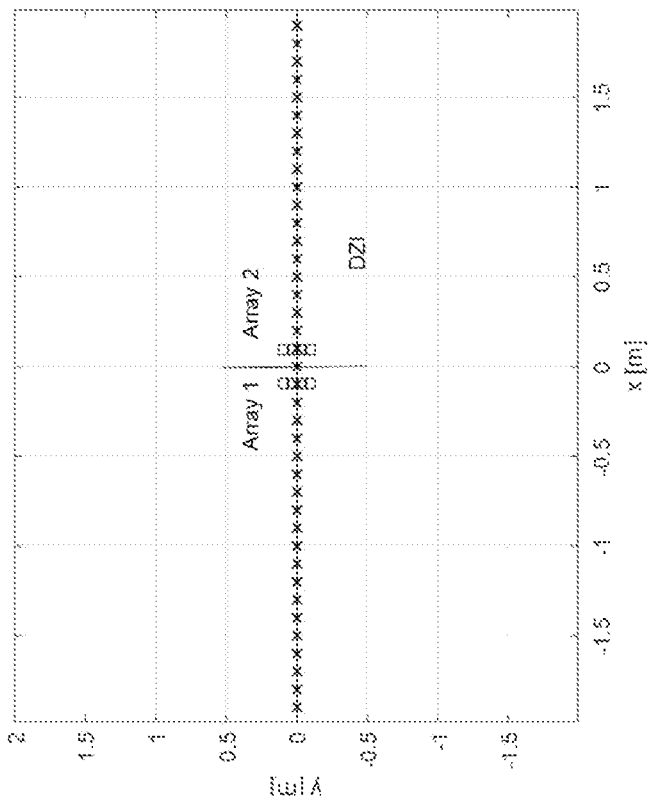
FIG. 12

RADIO BEACON SYSTEM

The present invention refers to a radio beacon system and related method that allow, in an efficient, reliable, versatile, extremely precise and inexpensive way, to assist autonomous flight of unmanned aerial vehicles (UAVs), also known as drones, the system entailing a low environmental and visual impact, since the necessary equipment requires low energy, involves low power radio frequency transmissions, has limited size easily adapting to (and being capable to be hidden in) the environment.

It is known that, although originally developed for military applications, in the last decades drones have been increasingly used for civil applications, such as monitoring, inspection, package delivery, training for pilots, games and hobbies. In particular, applications in infrastructure are investment monitoring, inspection, maintenance and asset inventory and, in this context, applications for inspection of assets of transmission system operators (TSOs) and distribution system operators (DSOs), such as electric lines, natural gas and other renewable power plants, are particularly interesting.

Operators in the field of UAV technology have developed systems for UAV (drone) localization and landing, and estimation of distance and angle of arrival, in particular by using antenna arrays, such as the electro-mechanical adaptive antenna tracking equipment on board an UAV disclosed in document US2017059688, the landing systems disclosed in documents WO2015160230A1 and U.S. Pat. No. 5,716,032, and the systems for estimation of distance disclosed in U.S. Pat. No. 7,580,378, WO2001094974A2 and WO1996025673A1.

Also, positioning systems based on signal processing techniques for deriving the relative or absolute coordinates of mobile or fixed targets, wherein use of antenna arrays is usually associated to the estimation of the angle of arrivals of the signals received by the target, have been disclosed as shown, for instance, by D. Macagnano et al. in "*A comprehensive tutorial on localization: Algorithms and performance analysis tools*", International Journal of Wireless Information Networks, vol. 19, no. 4, pp. 290-314, 2012.

Furthermore, systems for terrain referenced UAV localization, wherein the UAV position is derived by comparing the measured images or signals with known patterns, have been disclosed as mentioned, for instance, by S. Carreno et al. in "*A Survey on Terrain Based Navigation for UAVs*", OCEANS 2010 MTS/IEEE, pp. 1-7, 2010.

Moreover, systems based on phase interferometry have been adopted for UAV applications, where localization of a signal source is derived or processed according to the phase differences measured at the receiver as disclosed by R. F. Hanssen in "*Radar Interferometry: Data Interpretation and Error Analysis*", The Netherlands Kluwer, 2001, and by A. Moreira et al. in "*A tutorial on synthetic aperture radar*", in IEEE Geoscience and Remote Sensing Magazine, vol. 1, no. 1, pp. 6-43, March 2013.

However, such prior art solutions suffer from some drawbacks, mainly due to the fact that UAV applications specifically require higher spatial resolution than those reached by prior art techniques and the capability to also delimit regions, instead of single points. Also, prior art solutions involve complex structures and processing techniques, which are consequently expensive, and often require extremely high transmitted power levels, causing such solutions to be unfeasible for wide-spread UAV applications.

Therefore, it is an object of the present invention to assist autonomous flight of UAVs in an efficient, reliable, versatile, extremely precise and inexpensive way.

It is an additional object of the present invention to provide such assistance with low energy requirements, low power radio frequency transmissions, and limited size equipment.

It is specific subject matter of the present invention an adaptive beamforming method for assisting autonomous flight of an UAV as defined in claim 1.

Further embodiments of the adaptive beamforming method are defined in the dependent claims.

It is also specific subject matter of the present invention a radio beacon system configured to assist autonomous flight of one or more unmanned aerial vehicles (UAVs) as defined in claim 10.

The present invention is a radio beacon system configured to assist autonomous flight of UAVs based on a method for supporting precise positioning of flying vehicles, e.g. UAVs, by means of the identification of regions in which the vehicle is flying and of zones, in the following called "delimited zones", where the vehicle is allowed to fly or not. Instead of a single point like in the prior art positioning systems, such delimited zones can be 3D zones (i.e. space volumes), 2D zones (i.e. surfaces) and 1D zones (i.e. lines), as well as single points.

The system is composed of two main devices: a drone device that is installed on the UAV, and a radio beacon device installed on the ground. The drone device is a simple radio frequency transceiver (in the following also simply indicated as radio transceiver), while the radio beacon device contains the components allowing the system to properly operate: two or more antenna arrays, one or more radio frequency transceivers (in the following also simply indicated as radio transceivers), (at least) one processing unit (e.g. a microprocessor) for carrying out the method according to the invention and, optionally, (at least) one landing pad. The interaction between drone device and radio beacon device, achieved by exchanging radio packets on a pre-defined protocol (although such protocol is not an essential feature of the invention), provides the information useful for positioning the UAV with respect to the radio beacon device location on the ground and, therefore, it allows the radio beacon device to send proper commands to the UAV flight board through the drone device in order to make the UAV extremely precisely follow the flight route possibly including or consisting of a descend line for landing.

The method according to the invention, executed by the radio beacon device, is based on an adaptive beamforming for delimiting the zone around the radio beacon device and increasing the precision of identification thereof through an optimisation of the measure resolution; in particular, the method according to the invention exploits one or more signal quantity measures obtained by the physical layer of a radio system and, according to them, adapt beamforming weights of the antenna arrays for improving the precision of identification of one or more delimited zones around the radio beacon device. In fact, the adaptive beamforming carried out by the method according to the invention is adapted to the UAV altitude and position and then to the signal quantity measure range in order to increase resolution as the UAV distance from the beacon changes. This is different from the prior art systems where beamforming is typically associated to the search or estimation of the angle of arrival of a flying vehicle. In other words, the method according to the invention permits to interpret radio signals from the drone device and to return proper commands to the UAV flight board through the drone device achieving two main results: (i) delimitation of no-fly zones and (ii) delimitation of fly zones, till to the identification of a specific point or sequences of specific points (trajectory), including landing on the ground (typically on the same radio beacon device pad).

The main advantages of the radio beacon system, and related method, according to the invention are the localization precision at an affordable cost with respect to prior art solutions.

In fact, the radio beacon system according to the invention is configured to identify one or more generic regions in the space (which can be 3D zones, 2D zones, 1D zones or single points) with high precision.

The radio beacon system according to the invention can be used for autonomous inspections, entailing a reduction of specialized personnel on the ground, and, consequently, reducing costs and avoiding risks for operators inspecting hazardous plants. Also, the radio beacon system according to the invention may be used for autonomous package delivery, drastically minimising the risk of misplaced package delivery and eliminating the need for ground vehicle transportation, thus reducing fuel and vehicles fleet costs.

Advantageously, the radio beacon system according to the invention can be applied to any possible service provided by UAVs fleets, such as monitoring, inspection, package delivery, training for pilots, games and hobbies.

The present invention will be now described, by way of illustration and not by way of limitation, according to its preferred embodiments, by particularly referring to the Figures of the annexed drawings, in which:

FIG. 1 schematically shows a top plan view of the radio beacon device of a first embodiment of the radio beacon system according to the invention;

FIG. 2 schematically shows a perspective view of part of the radio beacon system of FIG. 1;

Figure 1:
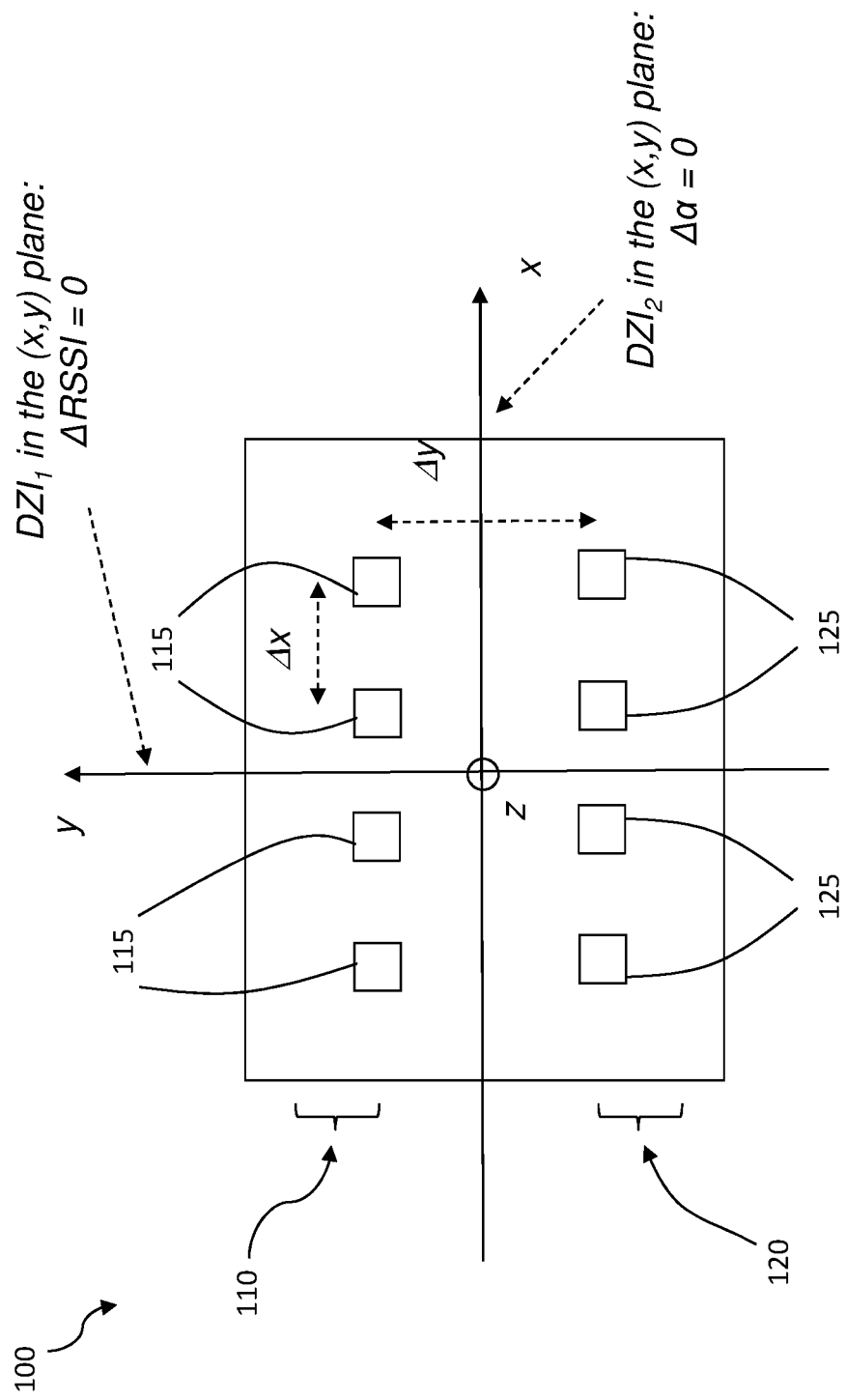
Figure 2:
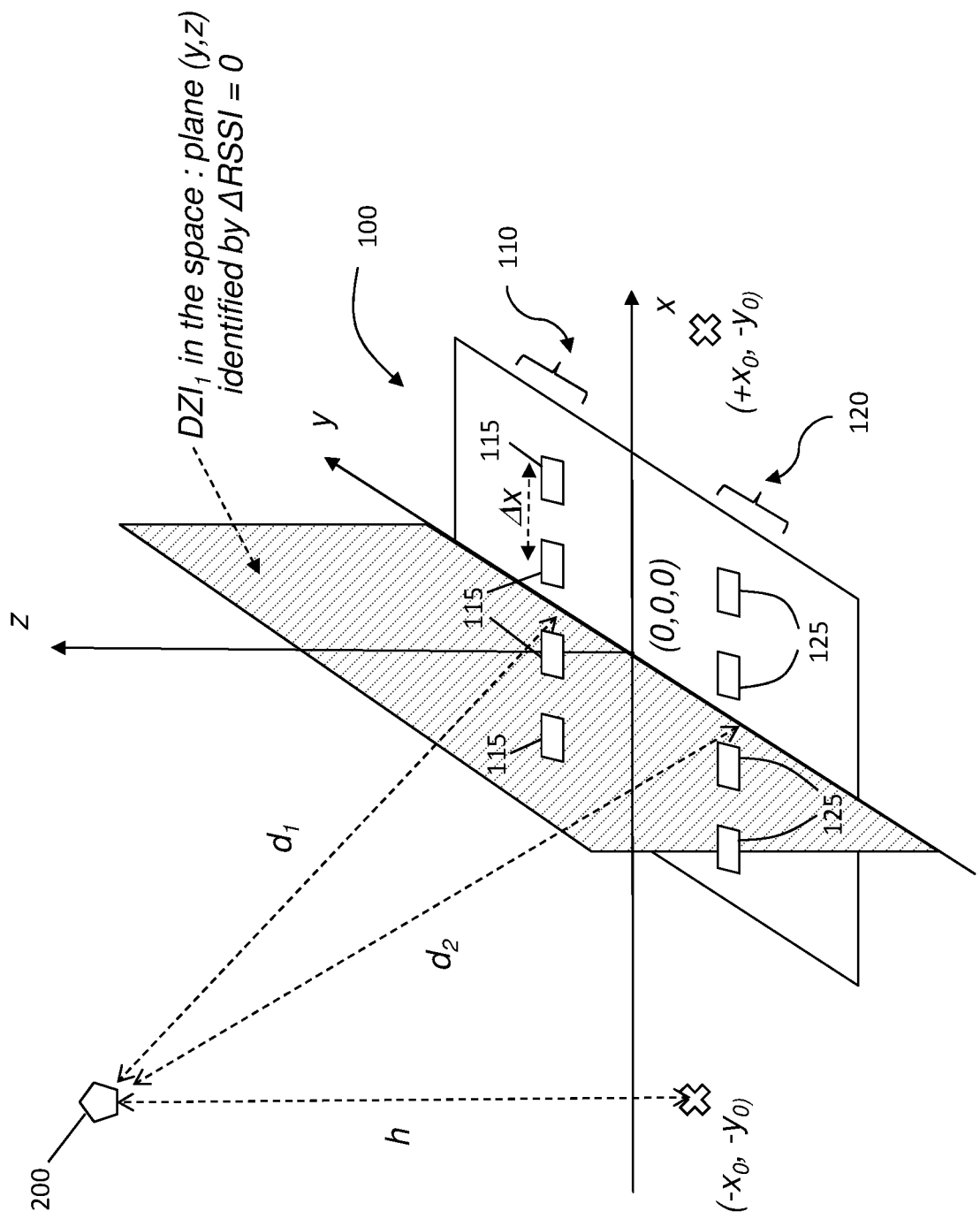
Figure 5:
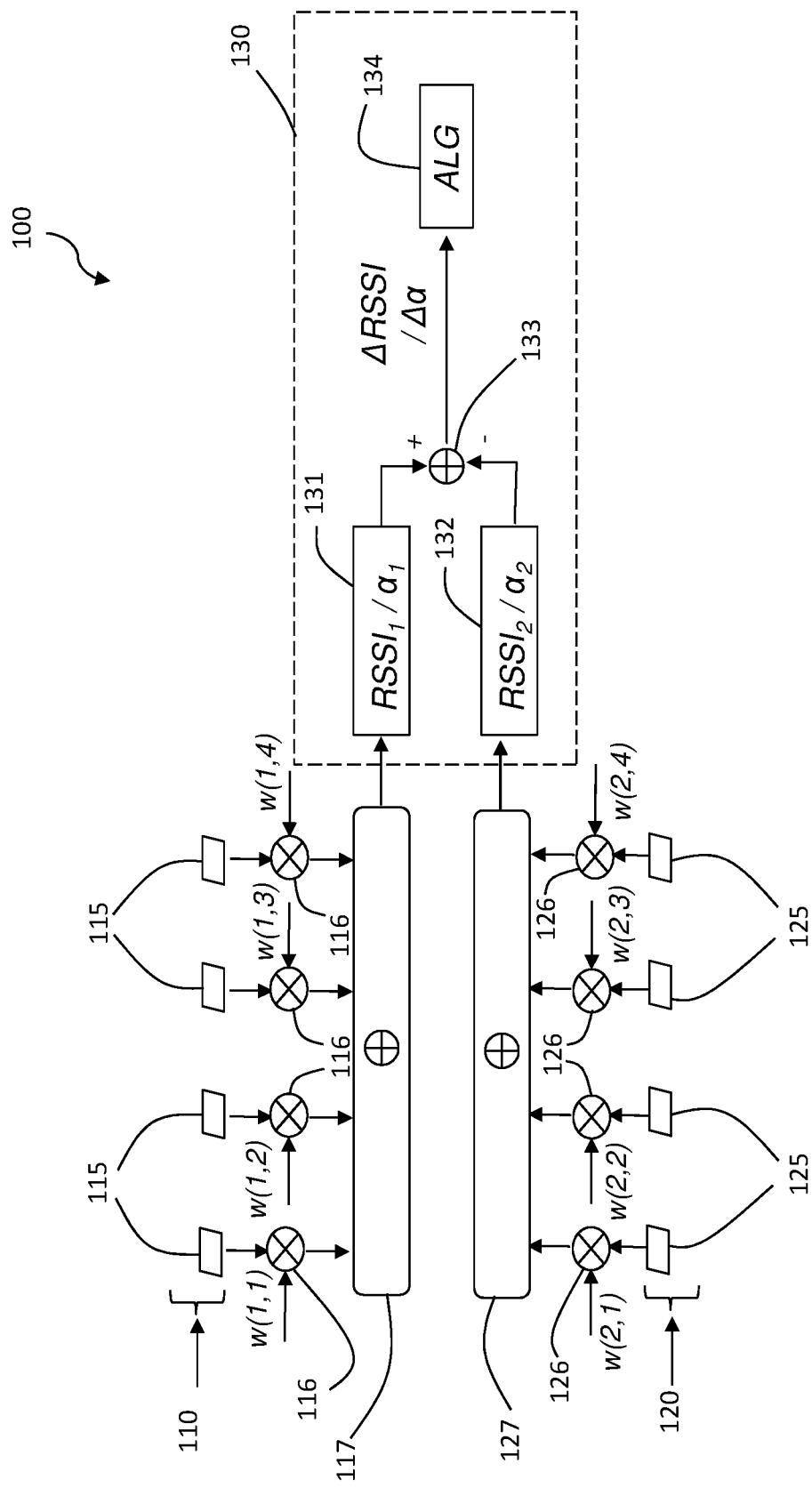
Figure 6:
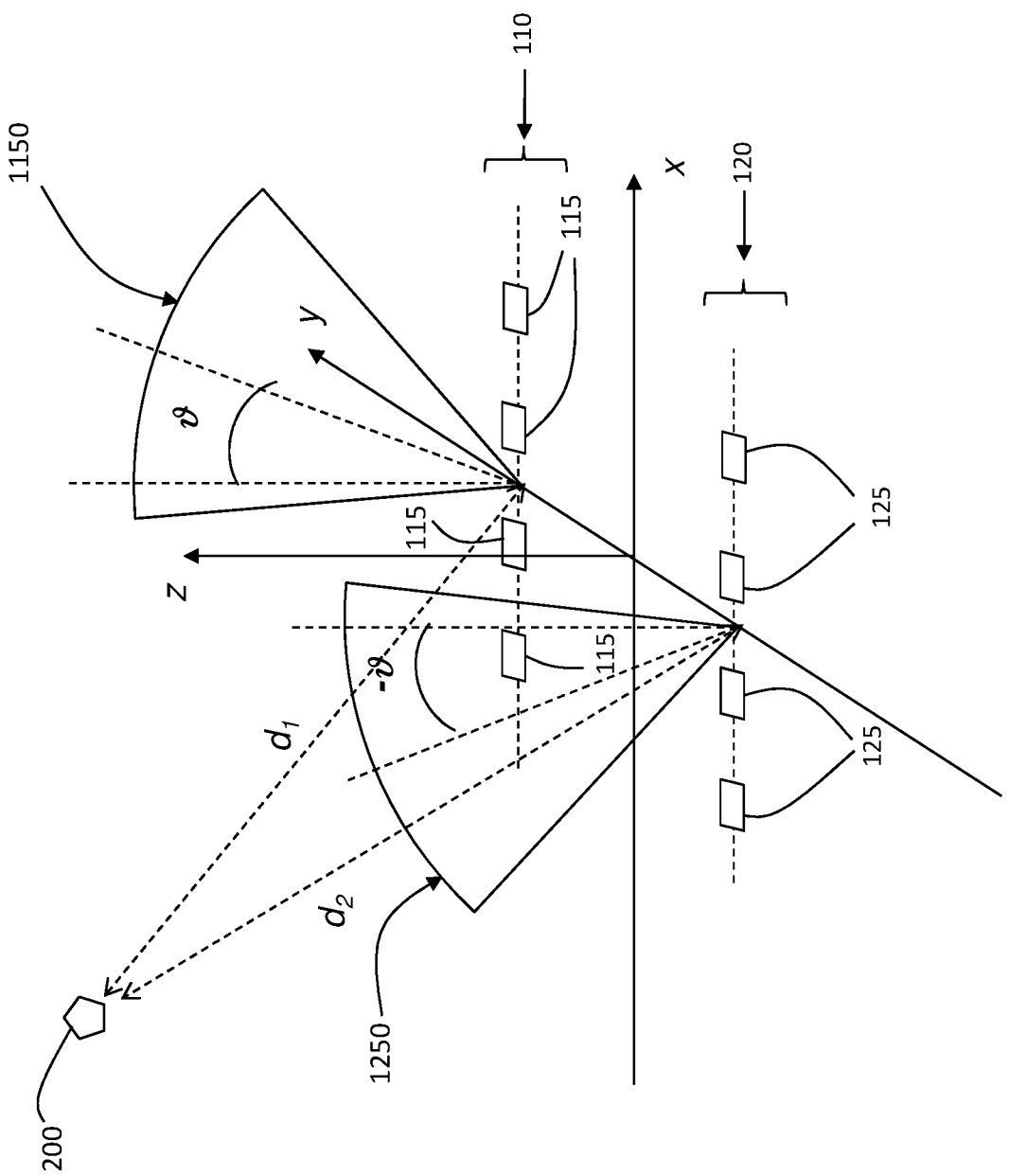
Figure 7:
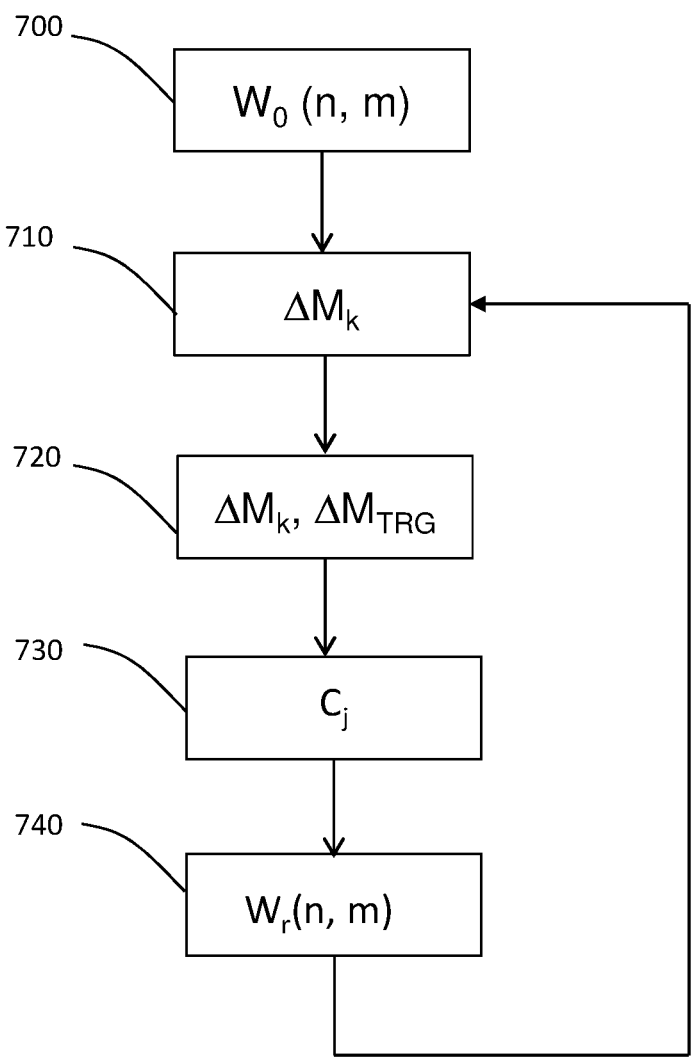
Figure 9:
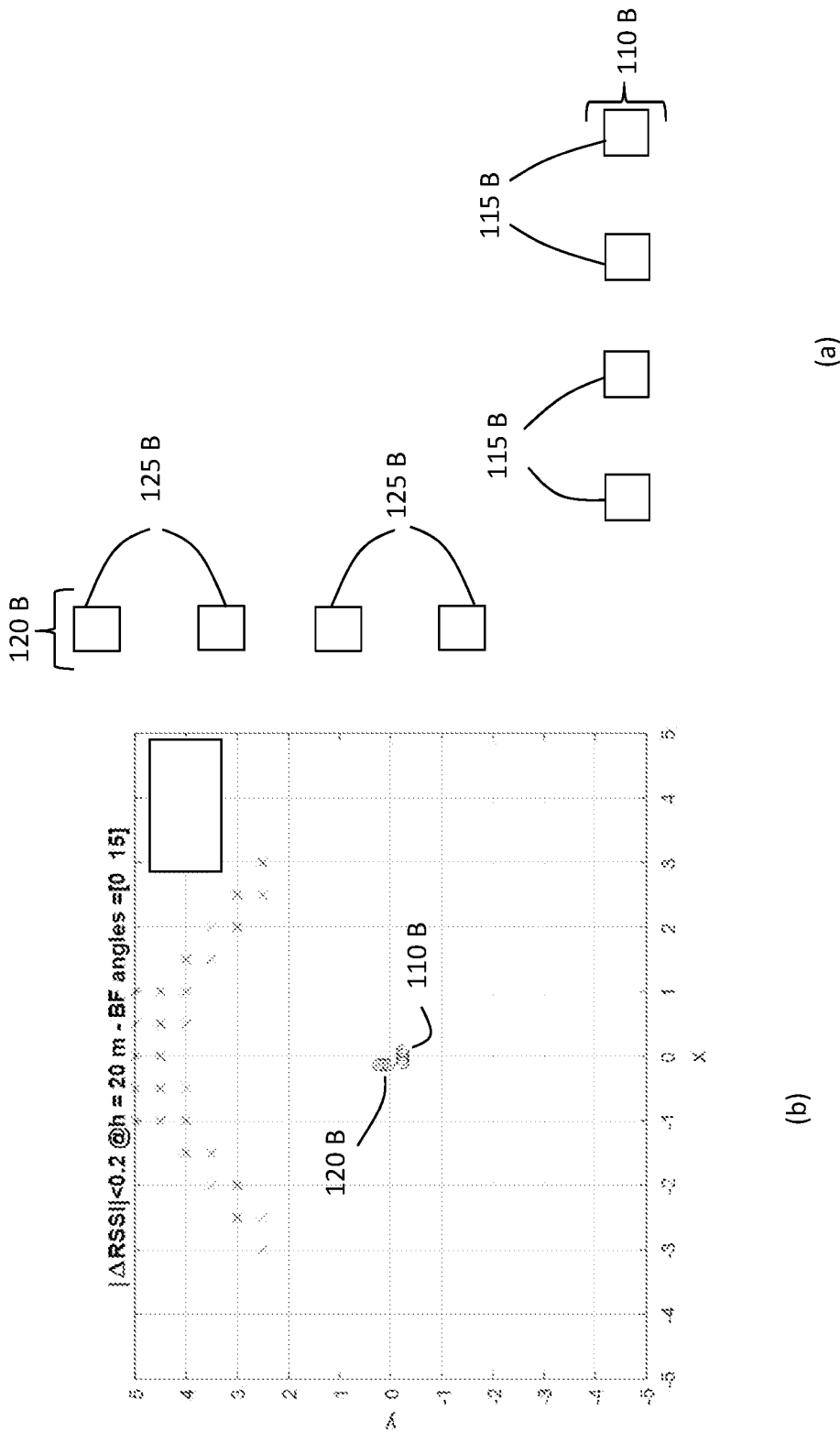
Figure 11:
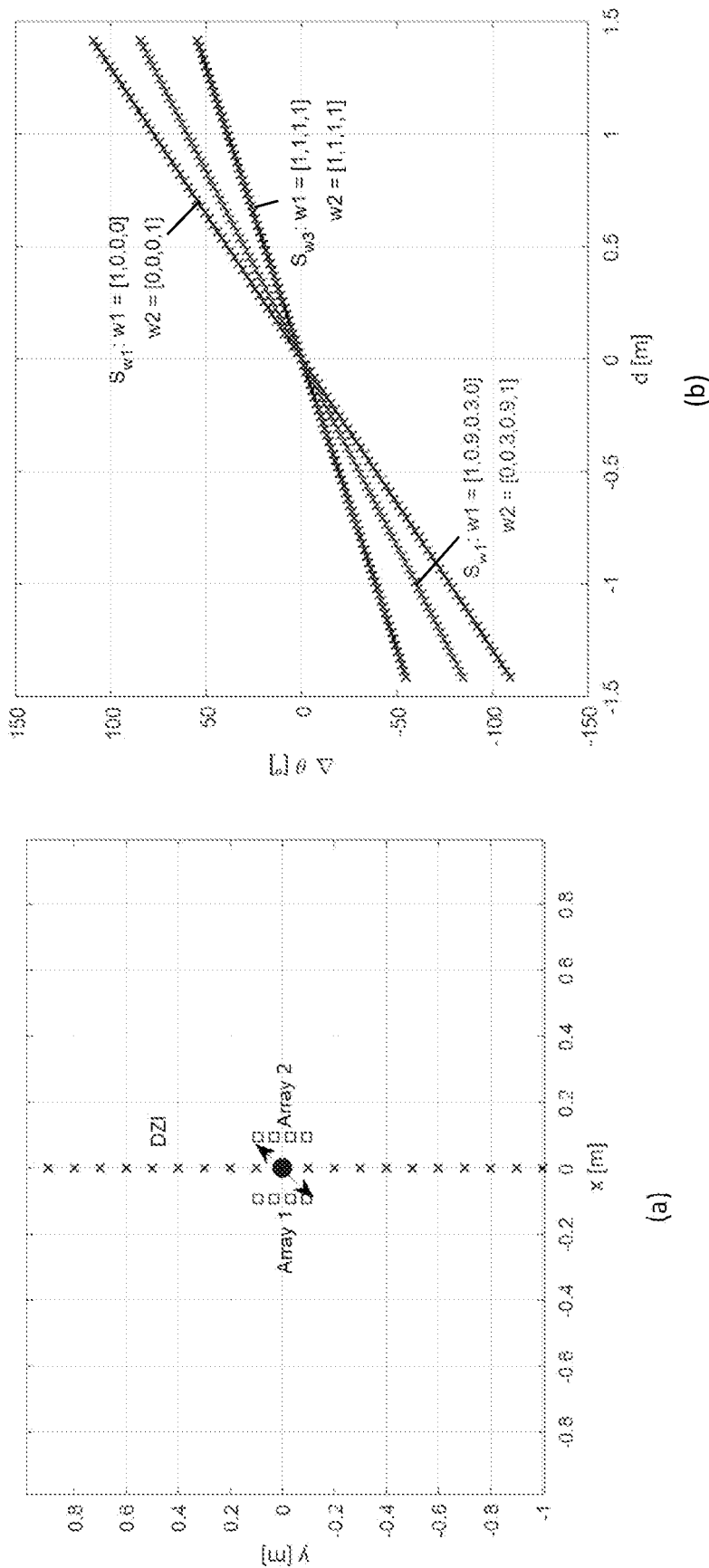

FIG. 5 schematically shows a block diagram of the radio beacon device of FIG. 1;

FIG. 6 schematically shows the radio beacon system of FIG. 2 according to a mode of operation;

FIG. 7 schematically shows a block diagram of the preferred embodiment of the adaptive beamforming method according to the invention;

FIG. 8a schematically shows a top plan view of part of the radio beacon device of a second embodiment of the radio beacon system according to the invention, and FIG. 8b schematically shows a top plan view of a delimited zone identified by the radio beacon device of FIG. 8a;

FIG. 9a schematically shows a top plan view of part of the radio beacon device of a third embodiment of the radio beacon system according to the invention, and FIG. 9b schematically shows a top plan view of a delimited zone identified by the radio beacon device of FIG. 9a;

FIG. 10a schematically shows a top plan view of part of the radio beacon device of a fourth embodiment of the radio beacon system according to the invention, and FIG. 10b schematically shows a top plan view of two delimited zones identified by the radio beacon device of FIG. 10a;

FIG. 11a schematically shows a top plan view of the arrangement of linear antenna arrays of the radio beacon device of the first embodiment of the radio beacon system according to the invention, and FIG. 11b plots the phase differences between the signals at the output of the two arrays "Array 1" and "Array 2", for three different sets of beamforming electronic weights as a function of the distance d of the UAV moving from the location (x, y)=(0,0) at the altitude h of 10 meters along the diagonal direction identified by the arrows in FIG. 11a; and FIG. 12a schematically shows a top plan view of the arrangement of linear antenna arrays of the radio beacon device of FIG. 11a, wherein the delimited zone is the plane at y=0, and FIG. 12b plots the RSSI difference between the signals at the output of the two arrays "Array 1" and "Array 2" as a function of the distance d of the UAV from the location (x, y)=(0,0) at the altitude h of 10 meters above ground (h=10 m) for two different sets of beamforming electronic weights.

In the Figures identical reference numerals will be used for alike elements.

In the following of the description, reference will be mainly made to a first embodiment of the radio beacon system, and related method, according to the invention including one radio beacon device having two parallel linear antenna arrays and one drone device. However, it must be understood that the radio beacon system, and related method, according to the invention may have a plurality of drone devices and/or a plurality of radio beacon devices, and the radio beacon device(s) may have any configuration of antenna arrays configured to carry out beamforming, e.g. two-dimensional or circular arrays, and more than two antenna arrays, still remaining within the scope of protection of the present invention as defined by the attached claims.

Making reference to FIGS. 1 and 2, a first embodiment of the radio beacon system includes a radio beacon device 100, installed on the ground, and a drone device 200, installed on an UAV (not shown), that is provided with a radio transceiver.

The radio beacon device 100 has two parallel linear antenna arrays 110 and 120, each with four antenna elements 115 and 125, respectively, which are represented by square (as seen from the top) in the Figures. However, it must be noted that the radio beacon device 100 may have any number N of antenna arrays, with N≥2, and/or each antenna array may have any number M of antenna elements, with M≥2. Also, the radio beacon device 100 is provided with a processing unit 130 (e.g. including one or more processors, as shown in FIG. 5), configured to perform a beamforming in the N antenna arrays 110 and 120 by modifying the set of beamforming electronic weights w(n, m) associated to each one of the M array elements 115 and 125, with n ranging from 1 to N=2 (index n indicates the n-th antenna array to which the electronic weight belong) and m ranging from 1 to M=4 (index m indicates the m-th antenna element of the n-th antenna array under consideration to which the electronic weight is associated).

Assuming that the reference system is a Cartesian coordinate system with the x-axis that is parallel to, as well as equidistant from, the lines along which the two antenna arrays 110 and 120 extend, the antenna element spacings $\Delta x$ are usually all equal to a fraction of the wavelength $\Delta$, typically $\Delta/2$, and antenna array spacing $\Delta y$ can be selected according to size limits of the radio beacon device 100 and range considerations about delimited zones. The altitude h of the UAV above the ground, and consequently the altitude h of the drone device 200 is measured with respect to the plane (x,y) or z=0 (i.e. with respect to ground), while the distances of the drone device 200 from the centres of the antenna arrays 110 and 120 are indicated with $d_1$ and $d_2$. It should be noted that in the Figures measures and size are not in scale:

h, $d_1$ and $d_2$ are usually much higher than the size of the radio beacon device 100, $\Delta x$ and $\Delta y$.

Figure 3:
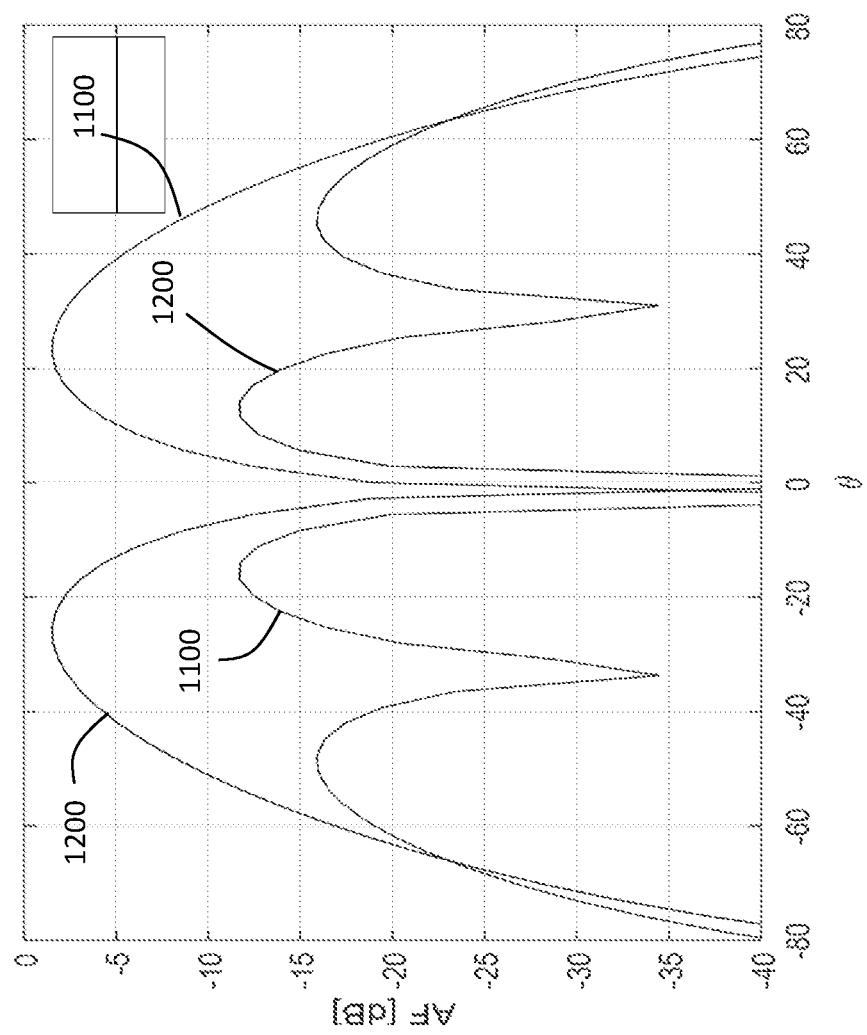
FIG. 3 shows an example of the array directivity functions of the radio beacon device of FIG. 1.
Figure 4:
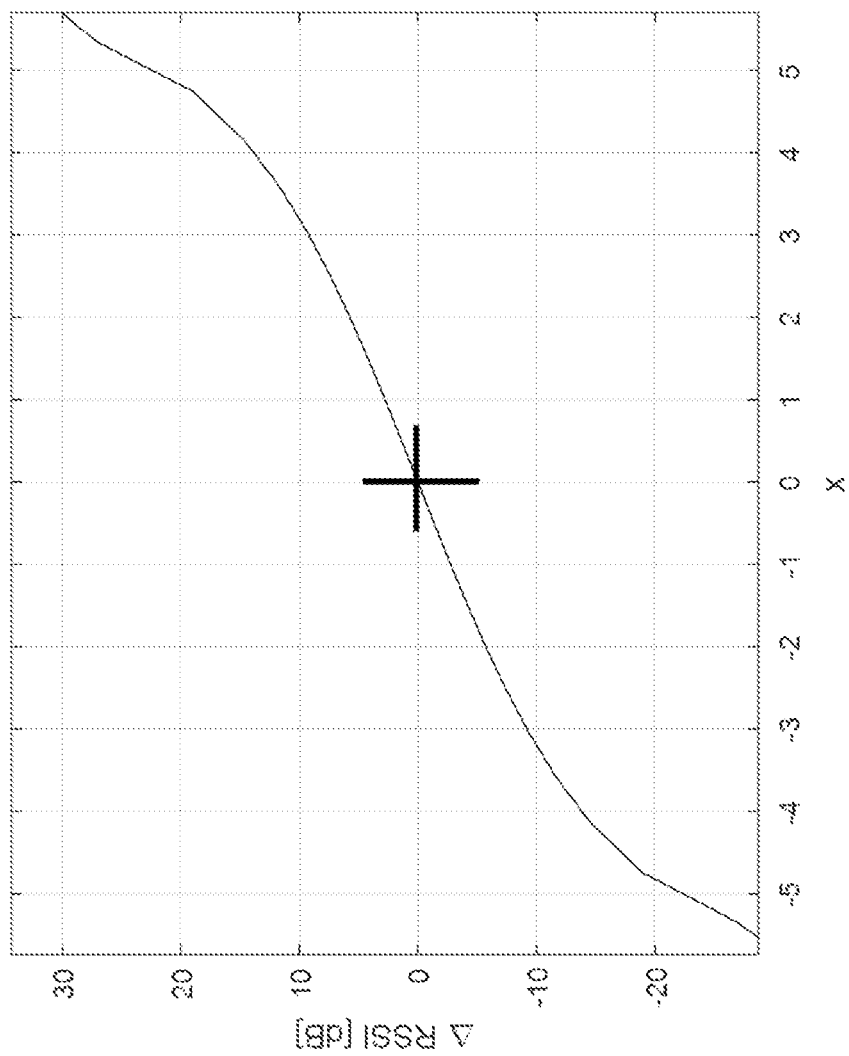
FIG. 4 shows an example of a graph of a signal processed by the radio beacon system of FIG. 2.

As shown in FIGS. 3 and 6, the two antenna arrays 110 and 120 (extending along lines parallel to the x-axis) are configured to steer the main beams 1150 e 1250 of their own array directivity functions 1100 and 1200 with opposite angles equal to $+\vartheta$ and $-\vartheta$, respectively, with respect to the axes parallel to the z-axis passing through the respective centres of the same antenna arrays 110 and 120. In this regard, while FIG. 6 schematically represents such mode of operation, FIG. 3 shows an example of the precise array directivity functions 1100 and 1200 of the two antenna arrays 110 and 120, respectively. As a consequence, the received signal strength intensity, also known as RSSI (i.e. the power of the received signal), at the two antenna arrays 110 and 120 will be different because of the different beam directions with respect to the position of the drone device 200 along the x-axis. At the same time, the difference $\Delta$RSSI of the RSSI at the two antenna arrays 110 and 120 will be exactly equal to 0 (zero), i.e. $\Delta$RSSI=0, only on the first (planar) delimited zone $DZI_1$, defined by the plane (y,z) where x=0, as shown in FIG. 2. Obviously, actually this plane is not infinite since, in practice, it is limited by the signal transmission range; at the same time, the condition $\Delta$RSSI=0 identifies univocally the $DZI_1$ in a neighbourhood of x=0 (where the radio beacon is located), i.e. until the sidelobes of the arrays generate other zones in the space characterized by $\Delta$RSSI=0. In this regard, FIG. 4 shows an example of the difference $\Delta$RSSI as a function of the position of the drone device 200 along the x-axis when the drone device 200 moves along the line between the points $(-x_0, -y_0, h=10\ m)$ and $(+x_0, -y_0, h=10\ m)$. In other words, when the signal quantity measure processed by the radio beacon device 100 is the RSSI, the two main beams 1150 and 1250 of the two antenna arrays 110 and 120 are rotated by opposite angles with respect to the plane (y,z), where x=0, in order to identify the first delimited zone $DZI_1$ by means of the measure $\Delta$RSSI=0.

Similar considerations are valid when the signal quantity measure is a phase measure, provided that orthogonal directions are considered. In fact, the signal phase $\alpha$ at each antenna array output depends on the length of the propagation path and on a term given by the antenna array. Hence, when a sinusoidal signal from the drone device 200 is received by the two antenna arrays 110 and 120, the phase difference $\Delta\alpha$ between the outputs of the two antenna arrays 110 and 120 is equal to 0 (zero), i.e. $\Delta\alpha=0$, only on the second (planar) delimited zone $DZI_2$ (shown in the (x,y) plane in FIG. 1) defined by the plane (x,z) where y=0, whereby the second delimited zone $DZI_2$ is orthogonal to the first delimited zone $DZI_1$. Again, the condition $\Delta\alpha=0$ identifies univocally $DZI_2$ in a neighbourhood of y=0, since it is well known that the phase associated to a propagation path is characterized by a periodicity equal to the wavelength, which corresponds to a 360° rotation; this ambiguity is not present when the receiver uses, as signal quantity measure, the time of propagation instead of the phase.

As shown in FIG. 5 in greater detail, each one of the two antenna array 110 and 120 of the radio beacon device 100 is provided with a multiplier 116 and 126 for each antenna element 115 and 125, wherein each multiplier 116 or 126 is configured to multiply the signal received at the respective antenna element 115 or 125 by the respective beamforming electronic weight w(n, m). The four multipliers 116 and 126 of each antenna array 110 and 120 are followed by corresponding adders 117 and 127 which determine the characteristics of the array directivity functions 1100 and 1200 of the antenna arrays 110 and 120. A processing unit 130 is configured to estimate the signal quantity measures from the output signals of the adders 117 and 127, e.g. in this case RSSI and/or signal phase $\alpha$ (as represented by blocks 131 and 132 in FIG. 5) and their differences $\Delta$RSSI and/or $\Delta\alpha$ (as represented by block 133 in FIG. 5). Also, the processing unit 130 is configured to carry out (possibly by means of at least one specific microprocessor represented with reference numeral 134 in FIG. 5) the adaptive beamforming method according to the invention that will be described in detail later.

In general, the signal quantity measure(s) processed by the radio beacon device 100 can be any physical parameter(s) related to the distance between the drone device 200 and the radio beacon device 100. In particular, the radio beacon device 100 is optionally configured to process at least one signal quantity measure selected from the group of physical parameters comprising or consisting of RSSI, phase rotation and time of propagation.

The radio beacon device has the capability of exploiting the degrees of freedom offered by the sets of beamforming weights for improving the resolution, and consequently the accuracy, of the commands sent to the UAV for respecting the delimited zones.

In the case where the signal quantity is RSSI, the measure resolution can be increased by using beamforming electronic weights with the same amplitude and different phases that steer the beams in order to improve the local signal intensity variation with respect to a variation of the distance of the UAV from the delimited zone (this peculiarity of the invention will be explained with additional details in step E of the invented method).

In the case where the signal quantity measure is phase rotation, the angular resolution can be increased by using beamforming electronic weights w(n, m) that have not the same amplitude, differently from the case where the signal quantity measure is RSSI wherein all beamforming electronic weights w(n, m) usually, even if not necessarily, have a normalized amplitude equal to 1. The processing executed by the method according to the invention enhances the signal contribution from the pairs of antenna elements which accumulate a higher phase difference with respect to a specific trajectory that the UAV is following. By way of example, and not by way of limitation, this is useful when the type of allowable commands to be sent to the drone are "return back" or "advance" on a specific trajectory that is independent from the particular geometric layout of the arrays and/or drone orientation and that cannot be controlled or changed by the system according to the invention. In this case, the system according to the invention is capable to enhance the response from the antenna elements that ensures a better response for the phase variation.

FIG. 11a shows a top plan view of the arrangement of linear antenna arrays of the radio beacon device of the first embodiment of the radio beacon system according to the invention (wherein the point of view is rotated clockwise, whereby the x-axis and the y-axis are exchanged with each other with respect to FIG. 1), which includes two linear antenna arrays indicated as "Array 1" and "Array 2", each with four antenna elements, respectively (which are represented by square, as seen from the top); the system according to the invention is capable to locally adapt the weights according, for example, to the orientation and/or trajectory of the UAV on which the drone device is installed and to increase accuracy with respect to the phase rotation. The delimited zone is the plane at x=0 (shown as a line in FIG. 11a) that is identified by equal phases received at the two arrays "Array 1" and "Array 2" which are parallel to the y axis. FIG. 11b plots the phase differences between the signals at the output of the two arrays "Array 1" and "Array 2", for three different sets $S_{W1}$, $S_{W2}$ and $S_{W3}$ of beamforming electronic weights $w_1=w(1, m)$ and $w_2=w(1, m)$ (with m ranging from 1 to 4), as a function of the distance d of the UAV on which the drone device is installed from the location $(x, y)=(0,0)$ at the altitude h of 10 meters above ground (h=10 m) and it is moving along the diagonal direction identified by the arrows in FIG. 11a (which diagonal direction is due, for instance, to previous commands and/or trajectory). It can be observed that either set $S_{W1}$ or $S_{W2}$ is preferred for stabilising the UAV at location $(x, y)=(0,0)$ with respect to the initial set $S_{W3}$ of beamforming electronic weights since the first derivative of the phase difference with respect to distance from the delimited zone is higher, thus providing a higher sensitivity to the local position variations of the UAV on which the drone device is installed with respect to the delimited zone and better accuracy. Similarly, the set of beamforming electronic weights can be optimized, taking into account also the SNR, for better responding to local position variations of the UAV along any direction.

In the case where the signal quantity measure is propagation time T, it is clear that it is strictly related to the phase rotation φ by means of the following relation:

$$\varphi = -\frac{2\pi d}{\lambda_{tx}} = -2\pi f_{tx} T$$

where $f_{tx}$ is the frequency of the signals transmitted (and received) by the radio frequency transceivers of the drone device and the radio beacon device of the system according to the invention. Therefore, using the propagation time as a signal quantity measure is equivalent to using phase rotation with respect to small scale variations around the delimited zone (since phase exploitation is clearly limited by the 360° cycle). According to these limitations, the RSSI can be used as signal quantity measure for large scale (or coarse) determination of the delimited zone, while phase rotation (or propagation time) can be advantageously used for small scale (or fine) determinations of the delimited zone and, consequently, higher accuracy.

In other words, the method according to the invention allows to use different physical parameters for defining the delimited zone(s) and updating the beamforming electronic weights w(n, m): for example, first RSSI for a coarse definition of the delimited zone(s) and then phase rotation or propagation time for a finer validation of the position with respect to the delimited zone(s).

Also, in general, the radio beacon device 100 has a number N of antenna arrays, with N≥2.

Furthermore, the radio beacon device 100 is provided with one radio transceiver per antenna array, namely with two radio transceivers (not shown in the Figures), configured to communicate with the radio transceiver of the drone device 200.

It should be noted that, in other embodiments of the radio beacon system according to the invention, the radio beacon device may be provided with only one radio transceiver. In this case, signal communications between the single radio transceiver of the radio beacon device and the radio transceiver of the drone device needed to obtain signal quantity measures for each antenna array occur sequentially (i.e. a sequence of signal communications for each antenna array) by using the same single radio transceiver of the radio beacon device, and this is feasible since the movement times of the UAV on which the drone device is installed are several orders of magnitude longer than the electronic processing response times. This entails that the single radio transceiver of the radio beacon device can be sequentially used even more times for all the antenna arrays before the UAV sensibly change its position (i.e. its coordinates) with respect to the radio beacon device. Similarly, it should be noted that, in other embodiments of the radio beacon system according to the invention, the radio beacon device may be provided with an even number of antenna arrays, the signals of which are treated in pairs, and with only one pair of radio transceivers: in this case, signal communications between the pair of radio transceivers of the radio beacon device and the radio transceiver of the drone device needed to obtain signal quantity measures for each pair of antenna arrays occur sequentially by using such pair of radio transceivers of the radio beacon device.

Assuming that the radio beacon device 100 operates according to a sampling period $T_S$, the signal quantity measure $M_{n,k}(d_n)$ at the sampling time $t_k=kT_S$ processed by the n-th antenna array, wherein n ranges from 1 to N (where N=2 for the first embodiment shown in the Figures), depends on the distance $d_n$ of the (centre of the) n-th antenna array of the radio beacon device 100 from the drone device 200.

On the basis of the N signal quantity measures $M_{n,k}(d_n)$ of all the N antenna arrays, the preferred embodiment of the adaptive beamforming method according to the invention executed by the radio beacon device outputs:

a set of one or more commands $C_j$ for autonomous flight or corrections of flight of the UAV on which the drone device 200 is installed at command time $t_j=jT_C$, where $T_C$ is the command period, where such set of one or more commands $C_j$ is sent to the UAV flight board through the drone device 200, in order to keep the UAV inside or outside one or more delimited zones identified by the N signal quantity measures $M_{n,k}(d_n)$, and updates of the set of beamforming electronic weights w(n, m) associated to each one of the M array elements of each one of the N antenna arrays.

In general, the command period $T_C$ is a multiple of the sampling period $T_S$, usually much longer than the sampling period $T_S$. Typical commands $C_j$ can be: a rotation by 360° in the same position of the drone device 200 for enhanced phase measurements; an advance by keeping the same direction; a return back in the opposite direction; and a rotation by an angle □ with respect to current flight direction, wherein can be advantageously equal to 90° or −90°.

In greater detail, with reference to FIG. 7, the preferred embodiment of the adaptive beamforming method according to the invention comprises the steps described in the following.

Step A (700) is a preliminary step setting the beamforming electronic weights w(n, m) to initial values $w_0(n, m)$ (n=1, . . . , N; m=1, . . . , M), wherein the array of initial values $w_0(n, m)$ depends on the type of selected signal quantity measure $M_{n,k}(d_n)$ to be used (e.g. RSSI, phase rotation or propagation time) and on the one or more delimited zones to be identified.

In step B (710), the method computes a difference vector $\Delta M_k$ having a number P of elements equal to the number of 2-combinations of N elements $$P = \frac{N!}{(N-2)!2!} = \frac{N!}{(N-2)! \cdot 2}$$

wherein each element is the difference of one out of all the possible combinations of two antenna arrays among the N antenna arrays of the radio beacon device 100. For instance, in the case where N=2, it is P=1, i.e. $\Delta M_k$ has one single element $$\Delta M_k = \Delta M_k(p) = \{M_{1,k}(d_1) - M_{2,k}(d_2)\}, \text{ where } p = P = 1;$$

in the case where N=3, it is P=3, i.e. $\Delta M_k$ has three elements $$\Delta M_k = \Delta M_k(p) = \{[M_{1,k}(d_1) - M_{2,k}(d_2)], [M_{1,k}(d_1) - M_{3,k}(d_3)], [M_{2,k}(d_2) - M_{3,k}(d_3)]\},$$

where p ranges from 1 to P=3; in the case where N=4, it is P=6, i.e. $\Delta M_k$ has six elements $$\Delta M_k = \Delta M_k(p) = \{[M_{1,k}(d_1) - M_{2,k}(d_2)], [M_{1,k}(d_1) - M_{3,k}(d_3)], [M_{1,k}(d_1) - M_{4,k}(d_4)], [M_{2,k}(d_2) - M_{3,k}(d_3)], [M_{2,k}(d_2) - M_{4,k}(d_4)], [M_{3,k}(d_3) - M_{4,k}(d_4)]\},$$

where p ranges from 1 to P=6.

Other embodiments of the method according to the invention may have that, in step B, the method computes each one of the P element(s) of the difference vector $\Delta M_k$ as an average, possibly a weighted average, $E[\Delta M_q(p)]$ of a continuous set of differences between selected signal quantity measures $M_{n,k}(d_n)$ of two antenna arrays among the N antenna arrays over time, namely along a series of Q sampling times $t_q = qT_S$, with q ranging from (k−Q+1) to k, whereby the Q sampling times include the current sampling time k and (Q−1) preceding sampling times; advantageously, $QT_S \leq T_{BF}$ where $T_{BF}$ is the beamforming weight update period. In this way, the method is capable to compensate possible temporary variations of the flight route (e.g. due to any sudden temporary event, like wind).

It must be noted that, in other embodiments of the method according to the invention, in step B, the method computes a difference vector $\Delta M'_k$ having a number P' of elements (with P'≥1) less than the number of 2-combinations of N elements, wherein the difference vector $\Delta M'_k$ includes a subset of all the possible differences of all the possible combinations of two antenna arrays among the N antenna arrays of the radio beacon device, whereby 1≤P'<P.

In step C (720), the method compares the P element(s) of the difference vector $\Delta M_k$ with the P element(s) of a target vector $\Delta M_{TRG}$ of specific target values which define a delimited zone in the space and which, in general, can depend on the altitude h of the drone device 200 (e.g. provided by a GPS sensor or other proper equipment included in the drone device 200 and/or radio beacon device 100). In other words, the delimited zone (that can be a 3D zone, i.e. a space volume, a 2D zone, i.e. a surface, a 1D zone, i.e. a line, or a single point) that is defined by the target vector $\Delta M_{TRG}$ is the (3D or 2D or 1D or single point) locus of the points that meet condition(s) that can be written as:

$$\Delta M_k(p) = \Delta M_{TRG}(p), \text{ or}$$

$$\Delta M_k(p) > \Delta M_{TRG}(p), \text{ or}$$

$$\Delta M_k(p) \geq \Delta M_{TRG}(p), \text{ or}$$

$$\Delta M_k(p) < \Delta M_{TRG}(p), \text{ or}$$

$$\Delta M_k(p) \leq \Delta M_{TRG}(p),$$

for each p ranging from 1 to P. In particular, comparing can include computing the difference(s) between the P element(s) of the vector $\Delta M_k$ and the P specific target value(s) of the target vector $\Delta M_{TRG}$, i.e. computing $(\Delta M_{TRG} - \Delta M_k)$. Also, any one of the previous conditions on $\Delta M_k(p)$ can be written with reference to the absolute values (e.g., $|\Delta M_k(p)| = |\Delta M_{TRG}(p)|$). For the embodiment of the radio beacon system shown in FIGS. 1, 2 and 6, where N=2 and P=1, the (single) specific target value of the target vector $\Delta M_{TRG}$ can be null $\Delta M_{TRG} = [0]$, whereby the delimited zone is the (y-z) plane $DZI_1$ where x=0 (i.e. perpendicular to the x-axis) when the signal quantity measure $M_{n,k}(d_n)$ is the RSSI, or the (x-z) plane $DZI_2$ where y=0 (i.e. perpendicular to the y-axis) when the signal quantity measure $M_{n,k}(d_n)$ is the phase rotation α. As stated above, the delimited zone that is defined by the target vector $\Delta M_{TRG}$ can be:

one plane that identifies a straight line on the ground (as shown in FIGS. 1 and 2) and, therefore, it can be used for giving a flight trajectory or delimiting a forbidden zone;

two planes, typically perpendicular to each other, which identify a point on the ground (as shown in FIG. 1) and possibly one or more reference descend lines for landing;

general combinations of planes and, hence, of lines and points on the ground, which can identify more complex forbidden regions or flight corridors and trajectories for autonomous or assisted UAV flight; in particular, these general combinations of regions can be generated and managed also with a specific time plan, in order to assist the UAV flight on a specific progressively varying trajectory.

However, it is immediate to the skilled person to also obtain other configurations of delimited zones defined by target vectors $\Delta M_{TRG}$, possibly by means of different antenna array configurations.

In step D (730), the method outputs a set of one or more commands $C_j$ for autonomous flight or corrections of flight of the UAV on which the drone device 200 is installed at command time $t_j = jT_C$ in order to keep the UAV inside (or outside) the delimited zone defined by the target vector $\Delta M_{TRG}$ according to the condition(s) to be met by the N signal quantity measures $M_{n,k}(d_n)$ in step C, and such set of one or more commands $C_j$ is sent to the UAV flight board through the drone device 200. For the embodiment of the radio beacon system shown in FIGS. 1, 2 and 6, assuming that $\Delta M_{TRG} = [0]$, the sign of current $\Delta M_k$ determines if the UAV on which the drone device 200 is installed is closer to one antenna array or to the other, i.e. which side the UAV occupies with respect to the (y-z) plane $DZI_1$, when the signal quantity measure $M_{n,k}(d_n)$ is the RSSI, or to the (x-z) plane $DZI_2$ when the signal quantity measure $M_{n,k}(d_n)$ is the phase rotation α.

In step E (740), the method updates the set of beamforming electronic weights $w_r(n, m)$ associated to each one of the M array elements of each one of the N antenna arrays at time $t_r = rT_{BF}$, where $T_{BF}$ is the beamforming weight update period. The beamforming weight update period $T_{BF}$ is typically a multiple of the sampling period $T_S$, usually much longer than $T_S$; the weights update generally depends on one or more of the altitude h of the drone device 200, its current position, its configuration (such as orientation and type of allowable commands), current measures, delimited zone shape, antenna array configuration, and complexity trade-offs in the method according to the invention.

In this regard, it must be noted that when the command period $T_C$ and/or the beamforming weight update period $T_{BF}$ are multiples of the sampling period $T_S$, the method according to the invention is configured to produce a set of one or more commands $C_j$ and/or to update the set of beamforming electronic weights $w_r(n, m)$ by taking account not only of the signal quantity measures at time $t_j = jT_C$ and/or at time $t_r = rT_{BF}$, but also of the trend of such signal quantity measures over time by computing measure averages over time sections in order to reduce measure noise; in this way, it is also possible to get additional information, e.g. ascertaining whether the UAV is getting closer to or further away from the radio beacon device.

The beamforming electronic weights $w_r(n, m)$ have a twofold role in the system and related method according to the invention: first, along with the antenna array layout and the target vector $\Delta M_{TRG}$, they identify the delimited zone(s) (such as $DZI_1$ and $DZI_2$ shown in FIGS. 1 and 2); secondly, they can be updated and refined (during the execution of the method according to the invention) in order to minimise the error in the identification of the delimited zone(s), wherein such refinement can be made according to one or more of the altitude h of the drone device 200 (e.g. provided by a GPS sensor or other proper equipment included in the drone device 200 and/or radio beacon device 100), its position (e.g. provided by a GPS sensor or by the same computations and/or measures made by the method steps), its configuration (e.g. orientation or type of available commands), the current values of the elements of the difference vector $\Delta M_k(p)$. Regarding this refinement, the method according to the invention maximises the difference vector $\Delta M_k$ of the drone device 200 given the delimited zone(s): enlarging the variation range of the signal quantity measures (i.e. the signal useful for estimating the position of the drone device 200 with respect to the radio beacon device), while the spatial distance $\Delta d$ from the target line is kept fixed (i.e. constant), improves the resolution $\delta = \Delta d / \Delta M_k$. In particular, the beamforming electronic weights $w_r(n, m)$ can be computed according to:

a) a fixed pre-computed table (open loop weight control) stored in a memory as a look-up table; and/or
b) a recursive technique operating for the optimisation of an objective cost function (closed loop weight control).

As a relevant example of this process, in step E (740), the method updates the beamforming electronic weights for increasing the current $\Delta RSSI$ maintaining fixed the position of the drone device 200 by steering the main beams 1150 e 1250 (i.e. by changing the angles) of the array directivity functions 1100 and 1200 of the antenna arrays 110 and 120 with respect to the axes parallel to the z-axis passing through the respective centres of the same antenna arrays 110 and 120. With reference to FIGS. 3 and 6, this corresponds to a slight increase of the opposite angles $+\vartheta$ and $-\vartheta$ of the array directivity functions 1100 and 1200 of the antenna arrays 110 and 120, so as to increase the ratio $\Delta M_k/\Delta d$, i.e. to decrease $\delta = \Delta d/\Delta M_k$ at a given altitude h of the drone device 200. Therefore, before the beamforming weight update, resolution is given by $$\delta_{initial} = |x_2|/\Delta RSSI_{2\_initial},$$

while after the beamforming weight update, resolution is given by $$\delta_{updated} = |x_2|/\Delta RSSI_{2\_updated} < \delta_{initial}.$$

This means that the same distance $|x_2|$ is examined with a larger $\Delta RSSI$ margin, resulting in a performance advantage and increased precision. In some embodiments of the method according to the invention, the beamforming electronic weights $w_r(n, m)$ can be updated for increasing the resolution $\delta$ while keeping the UAV position fixed (i.e. constant), for example in a period without flight commands transmission.

As an example regarding the phase measures, the method updates the beamforming electronic weights $w_r(n, m)$ according to the following principle: the signal contributions from the pairs of antenna elements that accumulate a higher phase difference with respect to a specific trajectory that the UAV is following are enhanced by using weights not necessarily having amplitude one (this is useful, for example, when the type of allowable commands to be sent to the drone are "return back" or "advance" on a specific trajectory which is independent from the particular geometric layout of the arrays and/or drone orientation that can neither be controlled nor changed by the system according to the invention). Therefore, the system according to the invention could enhance the response from the antenna elements that assure a better response for the phase variation (see also the previous explanation of FIGS. 11a and 11b).

At the end of step E (740), the method may return to execute:
step B (710), until an end event occurs, such as a landing of the UAV (e.g. on the landing pad of the radio beacon device 100) or the achievement of a stable equilibrium of the P element(s) of the difference vector $\Delta M_k$ with the P target values of the target vector $\Delta M_{TRG}$ (so that the comparison of the difference vector $\Delta M_k$ with the target vector $\Delta M_{TRG}$ meets one or more condition(s), except for a tolerance value, for a time longer than a stability threshold time; e.g., if the condition is $\Delta M_k(p) = \Delta M_{TRG}(p)$, such stable equilibrium is achieved when $(\Delta M_{TRG} - \Delta M_k)$ is equal to 0, except for a tolerance value, for a stability threshold time, e.g. of few seconds) or an end of the drone mission or an exit of the drone device 200 from the signal transmission range of the antenna arrays 110 and 120 of the radio beacon device 100; or step B (710), with a change of the signal quantity measure to be used (for example passing from RSSI to phase rotation in order to increase the accuracy in the delimited zone(s) definition), until an end event occurs, such as a landing of the UAV or the achievement of a stable equilibrium with respect to the target values of the target vector $\Delta M_{TRG}$ or an end of the drone mission or an exit of the drone device 200 from the signal transmission range of the antenna arrays 110 and 120 of the radio beacon device 100; or step C (720), with a change of the delimited zone(s) according to a scheduled flight plan or trajectory of the UAV.

According to the invention, each delimited zone or portion of delimited zone (that can be any of: a 3D zone, i.e. a volume; a 2D zone, i.e. a plane; a 1D zone, i.e. a line; a single point) is identified and accuracy is optimized by means of a two-phase mechanism, based on steps A and E, namely: definition of delimited zone(s) and accuracy optimisation.

As to the definition of delimited zone(s), these are defined by proper selections of respective target vectors $\Delta M_{TRG}$, which correspond to differences of one or more signal quantity measures (e.g. RSSI and/or phase rotation and/or time of propagation) at the output of the processing unit 130 shown in FIG. 5. In this regard, the same delimited zone can be defined by a number of equivalent weights vectors combinations greater than 1 (if not infinite in most cases).

As to accuracy optimisation, updating the method according to the invention progressively increases accuracy by updating the beamforming electronic weights. A redundant set of beamforming electronic weights vectors is exploited for selecting those combinations that, in the current particular configuration of the UAV (with reference to, e.g., altitude, position, orientation, type of accepted commands), ensures better performance, i.e. higher slope of the difference vector $\Delta M_k$ as a function of position offset $\Delta d$, that is a lower ratio $\Delta d/\Delta M_k$.

FIG. 12a shows the top plan view of the arrangement of linear antenna arrays of the radio beacon device of FIG. 11a, wherein the delimited zone is the plane at y=0 (shown as a line in FIG. 12a) that is identified by equal RSSI received at the two arrays "Array 1" and "Array 2", whereby $\Delta$RSSI=0. FIG. 12b plots the RSSI difference between the signals at the output of the two arrays "Array 1" and "Array 2" as a function of the distance d of the UAV on which the drone device is installed from the location (x, y)=(0,0) at the altitude h of 10 meters above ground (h=10 m) for two different sets $S_{W4}$ and $S_{W5}$ of beamforming electronic weights $w_4$=w(1, m) and $w_5$=w(1, m) (with m ranging from 1 to 4), wherein the set $S_{W4}$ directs the main beam of the array directivity function with angle at +/−36°, while the set $S_{W5}$ directs the main beam of the array directivity function with angle at +/−20°. Both the sets $S_{W4}$ and $S_{W5}$ define the delimited zone as the plane at y=0, but $S_{W4}$ is preferred when the UAV on which the drone device is installed is close to such delimited zone since it ensures a better slope of the system response, i.e. of the RSSI difference $\Delta$RSSI, as a function of the position offset d of the UAV, thus providing a higher sensitivity and better accuracy. The method according to the invention can use in step A the set $S_{W5}$ as initial values of the beamforming electronic weights w(n, m), since they ensure a larger zone where the signal from the UAV provides effective command towards the delimited zone (indicated in FIG. 12b as "Attractivity region").

Obviously, a scheduled flight plan or trajectory of the UAV can be formed by a sequence of different targets each defining a sequence of delimited zones that the UAV is required to reach, for instance a sequence of target points; in this case, the method according to the invention (a preferred embodiment of which is shown in FIG. 7) is executed for each target of the sequence.

It must be noted that in other embodiments of the radio beacon system according to the invention, the number N of antenna arrays may be larger than 2 (i.e. N>2). When the radio beacon device is provided with an even number N of antenna arrays, the signals of such antenna arrays (and consequently the beamforming electronic weights $w_r$(n, m) thereof) may be treated in pairs so that the array directivity functions of each pair of antenna arrays are directed along opposite angles, with respect to an angle $\vartheta_{0,u}$, $\vartheta_{0,u}+\vartheta_u$ and $\vartheta_{0,u}-\vartheta_u$, with u ranging from 1 to U=N/2 (in this embodiment the angles $\vartheta_{0,u}$ determine the delimited zones); in this case, in step E, the method according to the invention may update the beamforming electronic weights for increasing the current signal quantity measure (e.g. $\Delta$RSSI) maintaining fixed the position of the drone device 200 by slightly increasing the opposite angle $\vartheta_{0,u}+\vartheta_u$ and decreasing $\vartheta_{0,u}-\vartheta_u$, so increasing the angular distance between the array directivity functions of each pair of antenna arrays with respect to $\vartheta_{0,u}$. When the radio beacon device is provided with an odd number N of antenna arrays, the signals of such antenna arrays (and consequently the beamforming electronic weights $w_r$(n, m) thereof) may be treated in pairs except for a single "pivotal" antenna array, so that the array directivity function of the single "pivotal" antenna array is directed along an angle $\vartheta_0$ (for example $\vartheta_0$=0°, parallel to the z-axis orthogonal to ground) and the array directivity functions of each pair of antenna arrays are directed along opposite angles $\vartheta_{0,u}+\vartheta_u$ and $\vartheta_{0,u}-\vartheta_u$, with u ranging from 1 to U=(N−1)/2; in this case, in step E, the method according to the invention updates the beamforming electronic weights for increasing the current signal quantity measure (e.g. $\Delta$RSSI) maintaining fixed the position of the drone device 200 by slightly increasing the opposite angles $\vartheta_{0,u}+\vartheta_u$ and $\vartheta_{0,u}-\vartheta_u$ of the array directivity functions of each pair of antenna arrays, while the angle $\vartheta_0$ of the array directivity function of the single "pivotal" antenna array is kept fixed.

However, it must be also noted that neither the treatment in pairs of the signals of the antenna arrays (and consequently the beamforming electronic weights $w_r$(n, m) thereof) of the radio beacon device nor the arrangement in parallel of the linear antenna arrays (and not even the linear configuration of the antenna arrays) is essential for the invention.

As a first example, FIG. 8a shows a top plan view of the arrangement of linear antenna arrays of the radio beacon device of a second embodiment of the radio beacon system according to the invention, which includes two linear antenna arrays 110A and 120A, each with four antenna elements 115A and 125A, respectively (which are represented by square, as seen from the top). In this second embodiment, the two linear antenna arrays 110A and 120A are arranged along lines which are rotated of +45° and −45°, respectively, with respect to the x-axis (and the y-axis), whereby the two linear antenna arrays 110A and 120A are arranged along lines orthogonal to each other, rather than along parallel lines. In this case, when the signal quantity measure $M_{n,k}(d_n)$ is the RSSI and the (single) specific target value of the target vector $\Delta M_{TRG}$ is null $\Delta M_{TRG}$=[0], by using beamforming electronic weights so that the initial values of the angles of the array directivity functions of the antenna arrays 110A and 120A are both 0°, the delimited zones are the (y-z) plane $DZI_1$ and the (x-z) plane $DZI_2$, represented by the two perpendicular lines crossing each other at the origin in FIG. 8b. Additionally, by setting the (single) specific target value of the target vector $\Delta M_{TRG}$ equal to a very small value (e.g. equal to 0,2), a small area around the origin (as shown in FIG. 8b, actually around the z-axis at altitude h=20 m) is also identified by the condition $$\Delta M_k(p) \leq \Delta M_{TRG}(p)$$

along with the (y-z) plane $DZI_1$ and the (x-z) plane $DZI_2$; in FIG. 8b, points indicated with 'X' markers are those in which such condition on $\Delta$RSSI is met. In this case, the starting values of the angles of the array directivity functions of the antenna arrays 110A and 120A are both 0°, i.e. the array directivity functions of the antenna arrays 110A and 120A are parallel to the z-axis.

As a second example, FIG. 9a shows a top plan view of the arrangement of linear antenna arrays of the radio beacon device of a third embodiment of the radio beacon system according to the invention, which includes two linear antenna arrays 110B and 120B, each with four antenna elements 115B and 125B, respectively (which are represented by square, as seen from the top). In this third embodiment, the two linear antenna arrays 110B and 120B are arranged along lines which are parallel to the x-axis and the y-axis, respectively, close to the origin, whereby the two linear antenna arrays 110B and 120B are arranged along lines orthogonal to each other, rather than along parallel lines. In this case, when the signal quantity measure $M_{n,k}(d_n)$ is the RSSI and the (single) specific target value of the target vector $\Delta M_{TRG}$ is equal to a very small value (e.g. equal to 0,2), by using beamforming electronic weights so that the initial values of the angles of the array directivity functions of the antenna arrays 110B and 120B are 0° and 15°, respectively, an arch-like region (e.g. at about 4-5 meters)

approximately centred at the origin (as shown in FIG. 9b, actually around the z-axis at altitude h=20 m) is identified by the condition $$|\Delta M_k(p)| \le |\Delta M_{TRG}(p)|$$

which could be used for inspections, for example, around a lattice structure of an overhead power line; in FIG. 9b, points indicated with 'X' markers are those in which such condition on |ΔRSSI| is met.

As a third example, FIG. 10a shows a top plan view of the arrangement of linear antenna arrays of the radio beacon device of a fourth embodiment of the radio beacon system according to the invention, which includes three linear antenna arrays 110C, 120C and 140C, each with four antenna elements 115C, 125C and 145C, respectively (which are represented by square, as seen from the top). In this fourth embodiment, the first, second and third linear antenna arrays 110C, 120C and 140C are arranged parallel to the x-axis, whereby the three linear antenna arrays 110C, 120C and 140C are parallel to each other. In this case, when the signal quantity measure $M_{n,k}(d_n)$ is the RSSI and the target vector $\Delta M_{TRG}$ includes two specific target values (hence a subset of the three elements constituted by all the possible 2-combinations of 3 elements) both equal to null, namely including the target value of the RSSI difference of the second and first antenna arrays 120C and 110C and the target value of the RSSI difference of the third and second antenna arrays 140C and 120C, by using asymmetric beamforming electronic weights (i.e. not steering the beams at opposite angles $+\vartheta_u$ and $\vartheta_u$, as in other embodiments of the invention) so that the initial values of the angles of the array directivity functions of the antenna arrays 110C, 120C and 140C are 0°, 10° and 15°, respectively, a corridor parallel to the y-axis on the right of the radio beacon device, i.e. at positive x coordinates (as shown in FIG. 10b, actually parallel to the (y-z) plane $DZI_1$ at altitude h=20 m), is identified by the conditions $$|\Delta RSSI_{2-1}|=|\Delta RSSI_{2-1\_TRG}|=0$$

$$|\Delta RSSI_{3-2}|=|\Delta RSSI_{3-2\_TRG}|=0$$

which could be used for inspections of an overhead power line; in FIG. 10b, points indicated with 'X' markers are those in which such conditions are met. By inverting the initial values of the angles of the array directivity functions of the antenna arrays 110C, 120C and 140C, a similar corridor parallel to the y-axis on the left of the radio beacon device, i.e. at negative x coordinates (as shown in FIG. 10b, actually parallel to the (y-z) plane $DZI_1$ at altitude h=20 m), is identified by the same conditions.

Therefore, the use of the adaptive beamforming carried out by the method according to the invention has a twofold role: zone delimitation, on the one hand, and increase of precision by means of the update of the measures resolution as the UAV approaches the target delimited zone, on the other hand.

The advantages offered by the radio beacon system, and related method, according to the invention with respect to the prior art solutions are evident. In fact, the radio beacon system, and related method, according to the invention achieve a high positioning precision (e.g. with respect to GPS sensors or the like), its implementation is inexpensive (e.g. when compared to LIDAR system), it is independent from the current rotation of the UAV, it is capable to define one or more line limits, it can manage and control multiple UAVs, and it does not require any knowledge of the absolute azimuth or elevation of the UAV.

The preferred embodiments of this invention have been described and a number of variations have been suggested hereinbefore, but it should be understood that those skilled in the art can make other variations and changes without so departing from the scope of protection thereof, as defined by the attached claims.

The invention claimed is:

1. An adaptive beamforming method for assisting autonomous flight of an UAV on which a drone device (200) including a radio transceiver is installed, comprising the following steps:
   A. setting (700) beamforming electronic weights w(n, m) to respective initial values $w_0$(n, m), with n ranging from 1 to N and m ranging from 1 to M, wherein the beamforming electronic weights w(n, m) are associated to N antenna arrays (110, 120) with N≥2 of a radio beacon device (100) installed on ground, including one or more radio transceivers configured to communicate with the radio transceiver of the drone device (200), wherein each antenna array (110, 120) has M antenna elements (115, 125) with M≥2, wherein the initial values $w_0$(n, m) of the beamforming electronic weights w(n, m) direct main beams (1150, 1250) of array directivity functions (1100, 1200) of the N antenna arrays (110, 120) along respective N directions at angles with respect to an axis orthogonal to the ground which are different from each other, whereby, when the N antenna arrays (110, 120) receive a signal from the radio transceiver of the drone device (200), at least one received signal quantity measure $M_{n,k}(d_n)$ that is selected from a group of physical parameters of the received signal related to a distance ($d_n$) between the drone device (200) and one of the N antenna arrays (110, 120) is different for each one of the N antenna arrays (110, 120);
   B. computing (710) a difference vector $\Delta M'_k$ having one or more elements which are at least a subset of differences at at least one sampling time $t_k$ of said at least one received signal quantity measure between each one of all combinations of two antenna arrays among the N antenna arrays (110, 120);
   C. comparing (720) said one or more elements of the difference vector $\Delta M'_k$ with corresponding one or more target values of a target vector $\Delta M_{TRG}$ which define at least one delimited zone ($DZI_1$; $DZI_2$);
   D. outputting (730) a set of one or more commands ($C_j$) for assisting autonomous flight of said UAV with respect to said at least one delimited zone ($DZI_1$; $DZI_2$) and sending said set of one or more commands ($C_j$) to the drone device (200); and
   E. updating (740) the beamforming electronic weights w(n, m) to maximise said one or more elements of the difference vector $\Delta M'_k$ at an altitude h and/or in a specific position of the drone device (200) above the ground, and returning to execute step B until an end event occurs.

2. The adaptive beamforming method according to claim 1, wherein, when returning from step E to execute step B, said at least one received signal quantity measure is changed from a previous execution of step B.

3. The adaptive beamforming method according to claim 1, wherein after returning from step E to execute step B, in step C said one or more elements of the difference vector $\Delta M'_k$ are compared with corresponding one or more target values of a target vector $\Delta M_{TRG}$ which define at least one delimited zone ($DZI_1$; $DZI_2$) that is different from at least one delimited zone ($DZI_1$; $DZI_2$) previously defined, whereby a progressively varying trajectory of a flight plan of the UAV is defined.

4. The adaptive beamforming method according to claim 1, wherein said group of physical parameters comprises one or more of received signal strength intensity, phase rotation and time of propagation.

5. The adaptive beamforming method according to claim 1, wherein said one or more elements of the difference vector $\Delta M'_k$ are all the differences of said at least one received signal quantity measure between each one of all combinations of two antenna arrays among the N antenna arrays (110, 120), whereby the difference vector $\Delta M_k$ has a number of elements equal to the number of 2-combinations of N elements.

6. The adaptive beamforming method according to claim 1, wherein each one of said one or more elements of the difference vector $\Delta M'_k$ is an average, optionally a weighted average, $E[\Delta M_q(p)]$ over time of a time sequence of differences of said at least one received signal quantity measure between two antenna arrays among the N antenna arrays (110, 120).

7. The adaptive beamforming method according to claim 1, wherein said one or more target values of the target vector $\Delta M_{TRG}$ depend on the altitude h of the drone device (200) above the ground and/or a time according to a flight plan of the UAV.

8. The adaptive beamforming method according to claim 1, wherein said at least one delimited zone ($DZI_1$; $DZI_2$) is a space volume and/or a surface and/or a line and/or a single point.

9. The adaptive beamforming method according to claim 1, wherein said at least one delimited zone ($DZI_1$; $DZI_2$) varies with altitude h over the ground and/or with time.

10. The adaptive beamforming method according to claim 1, wherein in step E the beamforming electronic weights w(n, m) are updated by computing them according to:
 a) retrieval from a look-up table; and/or
 b) a recursive technique operating for optimising an objective cost function.

11. The adaptive beamforming method according to claim 1, wherein in step E the end event is a landing of the UAV or achievement of a stable equilibrium of said one or more elements of the difference vector $\Delta M'_k$ with said corresponding one or more target values of the target vector $\Delta M_{TRG}$ or an end of drone mission or an exit of the drone device (200) from a signal transmission range of the N antenna arrays (110, 120).

12. A radio beacon system configured to assist autonomous flight of one or more unmanned aerial vehicles (UAVs), wherein the radio beacon system comprises:
 a drone device (200), configured to be installed on an UAV and including a radio transceiver, and
 a radio beacon device (100), configured to be installed on ground and including N antenna arrays (110, 120) with N≥2, one or more radio transceivers configured to communicate with the radio transceiver of the drone device (200), and at least one processing unit (130), wherein each antenna array (110, 120) has M antenna elements (115, 125) with M≥2 associated to respective beamforming electronic weights w(n, m), with n ranging from 1 to N and m ranging from 1 to M,
wherein said at least one processing unit (130) is configured to perform the adaptive beamforming method for assisting autonomous flight of an UAV according to claim 1.

* * * * *